United States Patent [19]

Greene et al.

[11] Patent Number: 6,042,866
[45] Date of Patent: *Mar. 28, 2000

[54] PREPARATION OF INSTANT FRIED NOODLES

[75] Inventors: Robert Greene, Singapore, Singapore; Orlando Lim, Calamba-Laguna, Philippines; Tiang Seng Toh, Singapore, Singapore

[73] Assignee: Nestec S.A., Vevey, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/644,333

[22] Filed: May 10, 1996

Related U.S. Application Data

[63] Continuation-in-part of application No. 08/354,594, Dec. 13, 1994, abandoned.

[30] Foreign Application Priority Data

Feb. 7, 1994 [EP] European Pat. Off. .............. 94101840

[51] Int. Cl.[7] ....................................................... A23L 1/16
[52] U.S. Cl. ........................... 426/557; 426/451; 426/503
[58] Field of Search ..................................... 426/557, 451, 426/622, 458, 502, 503, 504, 506, 511, 512, 518, 640

[56] References Cited

U.S. PATENT DOCUMENTS

| | | |
|---|---|---|
| 4,230,735 | 10/1980 | Yoshida et al. . |
| 4,234,617 | 11/1980 | Sakakibara et al. . |
| 4,271,205 | 6/1981 | Kaneko . |
| 4,370,352 | 1/1983 | Murakami et al. . |
| 4,495,214 | 1/1985 | Seltzer et al. . |
| 4,590,083 | 5/1986 | Hatsugai et al. . |
| 4,675,199 | 6/1987 | Hsu . |
| 4,988,528 | 1/1991 | Tomoda . |

FOREIGN PATENT DOCUMENTS 1346897  2/1963  France .

OTHER PUBLICATIONS

WPI Database Derwent Abstract Accession No. 87–077431, Abstract of Handa Japanese Patent Document No. JP–A–54 005 052 (1979).

Patent Abstracts of Japan, vol. 8, No. 7 (C–204), Abstract of Hiromi Japanese Patent Document No. JP–A–58 175 462 (1983); and.

Shiranami, et al., English Language Translation of Japanese Patent Document JP–A–58 175 462 (1983).

*Primary Examiner*—Lien Tran
*Attorney, Agent, or Firm*—Vogt & O'Donnell, LLP

[57] ABSTRACT

Reduction of frying oil uptake is effected when preparing instant fried noodles by aggregating a plurality of gelatinized noodle dough strips to form a cake mass, subjecting the cake to heat to reduce its moisture content to an amount in a range of from at least about 10% and less than 30% by weight, frying the partially-dried cake in a mass of an edible oil and separating the fried cake from the frying oil mass. In another aspect of the invention, oil uptake reduction is effected by employing a dough having a protein content of from about 8% to about 13% by weight and/or containing an added proteinaceous substance ingredient, such as gluten, and/or containing maltodextrin as an ingredient.

15 Claims, No Drawings

1

PREPARATION OF INSTANT FRIED NOODLES

CROSS-REFERENCE TO RELATED APPLICATION

This application is a continuation-in-part application of application Ser. No. 08/354,594 filed Dec. 13, 1994 now abandoned.

BACKGROUND OF THE INVENTION

The present invention relates to preparation of instant fried noodles.

Traditional instant fried noodles generally are prepared with wheat flour which is blended with water and/or an aqueous solution known as Kan-sui, which includes alkali metal carbonates and phosphates, to form a dough which is kneaded, rolled into sheets and cut into strips typically having a width on the order of from about 0.6 mm to about 3.0 mm. The raw noodles are steamed to gelatinize the starch, and then the steamed noodles, which generally have a moisture content of from about 29% to about 35% by weight, are fried in oil for from about 1 minute to about 2 minutes at a temperature of from about 125° C. to about 160° C. The fried noodles are separated from the frying oil and then drained for removal of adhering oil while cooling. Typically, the fried noodles contain on the order of from about 17% to about 23% by weight of oil and have a moisture content on the order of from about 3% to about 8% by weight.

SUMMARY OF THE INVENTION

Since oil contributes a significant part of the costs incurred for preparation of fried noodles, an object of the present invention is to reduce the oil uptake of the noodles during frying, while still obtaining organoleptic properties comparable to the standard set by traditional high-fat prepared fried noodles. In the present invention, the oil uptake can be reduced by up to 35%, or more, from the amounts noted above, e.g., to an oil content of from about 10% to about 15% by weight.

We have found that one process to achieve oil reduction is to dry the noodles partially after steaming and before frying and to do so with the noodles being arranged in a molded cake form.

Another means discovered for achieving oil reduction is to prepare a noodle dough so that it is formulated to have a protein content of from about 8% to about 13% by weight, and/or by formulating a dough so that it contains an added proteinaceous substance ingredient, such as gluten in particular, such as in an amount of up to and inclusive of about 5% by weight, and/or by formulating a dough so that it contains a maltodextrin ingredient such as in an amount of up to and inclusive of about 5% by weight, each weight being based upon the weight (dry weight) of the farinaceous base employed to prepare the dough. In these embodiments, the noodles need not necessarily be formed into a cake, although such is preferred, and partial drying before frying is not required to achieve significant oil reduction, but the best results are achieved by partial drying before frying.

In accordance with the partial drying embodiment of the present invention, instant fried noodles are prepared by aggregating a plurality of strip pieces of noodle dough comprising gelatinized starch of a farinaceous base ingredient to form a cake mass of a plurality of noodle strips, subjecting the cake to a temperature and for a time sufficient to reduce the moisture content of the cake to obtain a partially-dried cake having a moisture content in a range of from about 10% up to less than 30% by weight, frying the partially-dried cake in a mass of an edible oil heated sufficiently to fry the cake noodles, and separating the fried cake from the frying oil mass, and preferably, then removing oil adhering to the surfaces of the the fried cake. The process also includes steaming strips of dough to gelatinize starch and cutting the gelatinized strips to obtain the gelatinized strip pieces.

The cake is subjected to heat energy to effect heating to dry the cake within less than about 10 minutes, and the heating is most advantageously carried out to dry the cake within less than about 5 minutes, and most advantageously, the drying is effected within about 1 minute. Drying is effected by subjecting the cake to temperatures in excess of 85° C. in the presence of drying air, preferably heated drying air, and particularly, in a range of in excess of 85° C. to about 220° C. in the presence of drying air, particularly heated dry air. The drying may be accomplished solely by supplying air heated to the noted temperatures to contact the cake or by supplying microwave energy and infrared radiation to the cake, preferably in the presence of drying air, particularly heated dry air.

DETAILED DESCRIPTION OF THE INVENTION

Ingredients suitable for preparing raw noodle dough for, in turn, preparing dough strips to be gelatinized need only comprise a farinaceous base ingredient, as conventionally employed to prepare noodles such as wheat flour, and water. Although the noodles may be prepared by extrusion techniques, the dough strips are prepared conveniently by mixing, kneading and sheeting methods which long have been known in the noodle and pasta art.

The ingredients may be mixed for from about 5 minutes to about 30 minutes to obtain a mixture which has a moisture content of from about 20% to about 35% by weight, preferably from about 28% to about 33% by weight, and then the mixture is kneaded to obtain a raw dough consistency sufficient for forming a sheet. The dough is passed through one or more sets of counter-rotating rollers to configure the dough into a sheet form which may have a thickness ranging from about 0.6 mm to about 2.0 mm. The sheet is cut into strips having a width ranging from about 0.6 mm to about 3.0 mm.

In practice of the present invention, it will be found that, for any particular set of processing conditions, as the width and/or thickness dimensions of the strips is increased, the object of reduced oil up-take is facilitated. Thus, it is preferred to process strips having a width of from about 1.1 mm to about 3.0 mm, and particularly from about 1.1 mm to about 1.5 mm, and having a thickness of from about 0.8 mm to about 1.2 mm.

As is conventional in the art for preparing "instant", i.e., pre-cooked, noodles, steaming of the raw dough is carried out to gelatinize starch of the dough. To effect such, steaming may be carried out by passing raw dough strips through an enclosure to subject the strips to a moist steam atmosphere having a temperature of from about 95° C. to 105° C. The strips may be maintained in that atmosphere for from about 40 seconds to about 120 seconds, for example, and the gelatinization procedure may or may not be carried out in the presence of such as a spray of water to increase the moisture content of the strips. In general, the steam-gelatinization procedure is carried out to obtain a strip product having a moisture content of at least about 30% and on the order of from about 30% to about 37% by weight, and preferably, so that a substantial portion of the starch, i.e., up to about 90% and preferably up to about 95%, is gelatinized.

In carrying out cake formation, the steamed strips are cut into strip pieces having lengths suitable for making a cake of desired dimensions, and then the pieces are aggregated into a cake form of a desired shape, generally a cubic form, such as by folding individual strip pieces in half and combining a plurality of folded strip pieces to prepare a structured, or molded, cake. For example, strip piece lengths on the order of from about 20 cm to about 24 cm may be employed, and an amount of the strip pieces is employed so that the product obtained after frying weighs from about 25 g to about 100 g, but more preferably from about 65 g to about 85 g, and particularly from about 70 g to about 80 g. In addition, the strip pieces may be intertwined or randomly arranged to enhance structural integrity. So, too, the strip pieces are arranged so that voids or spaces exist in the cake prior to drying and/or are created upon heating for drying the cake.

In accord with partial drying aspect of the present invention, the formed cakes are heated for partially drying the cakes, but the cakes should not be over-dried, which is here intended to mean below a moisture content of about 10% by weight, since oil penetration in the subsequent frying step would be retarded, resulting in lesser organoleptic quality, as compared with traditionally prepared fried noodles. It also has been found that when operating in accordance with the present invention, when the moisture content is above about 10%, accumulation of oil on the noodle surface is reduced in comparison with noodles having a moisture content of less than about 10% prior to frying.

In one embodiment of the partial drying aspect of the present invention, the noodle cakes are subjected to a temperature of from above 85° C. up to about 100° C. to obtain partially-dried noodle cakes having a moisture content of from at least about 10% to less than about 30% by weight and advantageously, from about 15% to about 25% by weight. Conveniently, hot drying air having the noted temperatures is employed, and in this case, the period of such drying may range from about 1 minute to about 10 minutes, but the drying preferably is carried out for a period of from about 2 minutes to about 7.5 minutes, preferably, at a temperature of from about 90° C. up to about 100° C.

In a second partial drying embodiment, the noodle cakes are subjected to a temperature of from 100° C. to about 220° C., but preferably from above 110° C. to about 220° C., to obtain noodle cakes having a moisture content of from at least about 10% to less than about 30% by weight and advantageously, from at least about 10% to about 20% by weight. For any particular moisture content, drying in this embodiment may be accomplished in a time period less than that employed in the first drying embodiment described above. Thus, the period of such drying may be from about 15 seconds to about 4 minutes, but preferably, the cakes are dried with hot air at a temperature so that drying is effected within from about 20 seconds to about 3 minutes and especially, within from about 30 seconds to about 2 minutes, and to effect such, air temperatures on the order of from about 115° C. to about 200° C., of from about 130° C. to about 180° C., and of from about 140° C. to about 160° C., respectively, may be employed. At temperatures of from about 160° C. to about 200° C., the duration of the air-drying of the noodle cakes may be advantageously be for from about 20 seconds to about 1 minute.

As discovered from practice of the present invention in accordance with the second partial drying embodiment, as compared with traditionally prepared high-fat fried noodles and in comparison even with noodles prepared in accord with the first drying embodiment, noodles having a more porous structure are obtained which improves and enhances reconstitution of the noodles with water. So, too, the formation of a porous structure has been found to provide for oil penetration into the noodles of the cakes and to result in less apparent oil adhering to the noodle surfaces which, surprisingly, has been found to provide a more pleasing appearance, because oil on the noodle surfaces is less visually apparent. This, in turn, provides a more aesthetically appealing product to the consumer not only because it has a better appearance, but also because it produces a less "greasy" character and feel to the touch, and because it operates to inhibit oil accumulating on package surfaces. So, too, surprisingly, although the noodle strips are more porous, they do not operate to increase quantities of oil taken up during frying.

In each partial drying embodiment, the drying environment is preferably solely air, and thereby in the absence of delivery of steam for heating, and preferably, substantially all moisture is removed from the air which is delivered for drying. Additionally, as indicated above, infrared radiation means may be employed for drying, but preferably only in combination with a supply of drying air, preferably hot dry air to remove moisture from the infrared drying environment. Further alternatively, as also indicated above, microwave drying means may be employed, the microwave energy supplied being equivalent with the drying capability provided by the hot air temperatures noted above. The microwave energy supplied in combination with drying air convection, preferably hot drying air, to remove moisture from the microwave environment may be found, in general, to enable obtaining drying times or the order of less than about 1 minute.

Since drying may be performed within the time periods described above, if it is desired to use existing noodle line equipment including steaming and frying means, some modifications necessarily are required to incorporate a drier means in-line between a steamer and a fryer. It also may be found that, because of shortened drying time, microwave means may be incorporated more readily in existing noodle lines to maintain existing production rates.

Conveniently, the cakes of gelatinized strips are transported through a drier in buckets, which preferably allow air flow therethrough, by means of a gondola-type conveyor, and the buckets conveniently are of a punch-perforated type for allowing flow of air about the cake and flow of moisture away therefrom.

After drying, the partially-dried cake is fried in a mass of an edible oil, such as is conventionally employed, and transport of the cake through the oil may be effected conveniently with the noted bucket/gondola system. The temperature of the frying oil may range from about 125° C. to about 160° C., and the partially-dried cakes may be fried in oil so heated for from about 15 seconds to about 70 seconds. Although cakes dried in accordance with the second embodiment described above are fried advantageously at temperatures up to about 160° C., and particularly from about 140° C. to about 160° C., which enable frying in a time as short as on the order of about 15 seconds, desirable results are obtained with cakes dried by either of the first or second embodiments described above by frying in oil which has a temperature on the order of from about 125° C. to about 135° C. Times for frying at such temperatures advantageously may range from about 20 seconds to about 40 seconds, although times up to about 70 seconds may be employed.

As will be appreciated from the foregoing, by reason of oil-uptake reduction, the amount of oil required to fry any particular weight/volume of noodles, as compared with the traditional process, is less. This, too, may enable use of friers smaller than heretofore traditionally employed.

It also surprisingly has been discovered that, for any particular processing condition described above, formulating the noodle dough so that it has a protein content of from about 8% to about 13% by weight enables obtaining lower amounts of oil up-take as compared with lesser protein amounts. Such may be achieved by using hard wheat flour or by adding a proteinaceous substance as an ingredient for preparing the dough, particularly gluten and wheat gluten in particular, to the ingredients to increase the protein content. For example, when using soft wheat flour, gluten is advantageously included in an amount of up to about 5% and preferably, from about 2% to about 4% based upon the weight of the flour employed.

So, too, it surprisingly has been discovered that, for any particular processing condition described above, formulating the noodle dough to have an amount of maltodextrin also results in reduced oil uptake and results in a product having the desired texture and flavor, as well as having other organoleptic characteristics which are comparable with those provided by traditional high-fat noodles. The maltodextrin may be employed in an amount up to about 5% by weight and preferably, from about 3% to about 5% by weight, based upon the weight of flour.

Combinations of added protein and maltodextrin also may be employed advantageously.

The ingredients employed to prepare the dough also usefully may include alkali metal carbonates and phosphates, as are employed in traditional fried noodles, including potassium and sodium carbonates and phosphates, which may be provided by the traditional Kan-sui solution which thereby operates to provide water for preparing the dough. Other ingredients which may be employed include gums, particularly guar gum, and include alginates and sodium carboxyl methyl cellulose, and agents also known in the art as leavening agents also may be employed.

After frying, the fried noodle cake is separated from the frying oil, and frying oil adhering to surfaces of the fried cake is removed, such as by draining for removal of oil from the noodle surfaces, or by blowing a gas such as air at the cakes to remove excess surface oil or a combination thereof so that the amount of apparent oil is reduced. As will be appreciated, during oil removal, the cakes may be allowed to cool to ambient room temperature, and the oil removal may be carried out on a perforated conveyor, which may include cooling means, and a stream of gas, be it air or an inert gas may be directed at the cakes to facilitate removal of oil adhering to noodle surfaces preparatory to packaging. Alternatively, a cooling conveyor may be positioned downstream of a draining conveyor or other oil removal means.

In general, the fried noodle cakes prepared in accordance with the present invention may be prepared for consumption with boiling water within about 2 minutes to about 3 minutes, and the cakes have good stability during storage because of their lowered fat content.

EXAMPLES

The following Examples further illustrate the present invention. Parts and percentages are given by weight.

Example 1

75 parts of dry wheat flour (~10.25% protein), 1.5 parts of salt and 23.5 parts of Kan-sui solution, which contains 1.0% by weight of potassium and sodium carbonates and phosphates, is placed in a horizontal dough mixer and mixed for 20 minutes. After mixing, the dough is reduced to a thickness of 1–2 mm by passing through a series of rollers. The sheet then passes through a cutter where it is cut into strips of 1.5 mm width. The strips are steamed and then cut and molded into noodle cakes, the dimensions of which are 110 mm×110 mm×25 mm (weight about 75 g). The molded noodle cakes are transferred to perforated buckets and transported on a gondola-type conveyor through an air drier and heated with air having a temperature of 100° C. for 4 minutes. The dried cakes, the noodles of which have an average moisture content of 15%, are transported to a fryer and conveyed for 40 seconds through frying oil having a temperature of 125° C.

After frying, the fried cakes are transported to a cooling conveyor where they are drained and cooled to ambient temperature. The oil content of the noodles of the drained fried cakes averages 13%.

Samples of the instant fried noodles are stored for 6 months at 30° C. and 75% relative humidity. Taste-testing of the stored product indicates no detectable rancidity.

Example 2

75 parts of dry wheat flour (~10.25% protein), 1.5 parts of salt and 23.5 parts of Kan-sui, as in Example 1, are processed and molded into cakes as in Example 1 and transported in buckets on a gondola type conveyor to and through an air drier. Hot air having a temperature of 130° C. is applied to the cakes for 50 seconds. The dried cakes, the noodles of which have an average moisture content of 13%, are transported to a fryer and are conveyed for 30 seconds through frying oil having a temperature of 150° C.

After draining and cooling, as in Example 1, the oil content of the noodles of the fried cakes averages 12%. After storage, as in Example 1, taste-testing indicates no detectable rancidity.

Comparison Example

Ingredients are processed as in Example 1 to prepare strips which are steamed as in Example 1. The steamed strips are formed into cakes, but the cakes are not dried. The steamed cakes are transported to a fryer and conveyed for 50 seconds through frying oil having a temperature of 130° C. After draining and cooling, as in Example 1, the oil content of the noodles of the fried cakes averages 20%. After storage, as in Example 1, taste-testing indicates no detectable rancidity.

Example 3

71 parts of dry soft wheat flour (~10.25% protein), 4 parts of wheat gluten, 1.5 parts of salt and 23.5 parts Kan-sui solution are processed and molded into cakes as in Example 1, but the cakes are not dried. The cakes are conveyed for 50 seconds through frying oil having a temperature of 130° C. After draining and cooling, the noodles of the fried cakes have an oil content which averages 17%, and after storage as in Example 1, taste-testing indicates no detectable rancidity.

Example 4

70 parts of dry soft wheat flour (~10.25% protein), 5 parts of maltodextrin, 1.5 parts of salt and 23.5 parts Kan-sui solution are processed and molded into cakes as in Example 1, but are not dried. The cakes are conveyed for 50 seconds through frying oil having a temperature of 130° C. After draining and cooling, the noodles of the fried cakes have an oil content which averages 18%, and after storage, as in Example 1, taste-testing indicates no detectable rancidity.

As is clear from the foregoing, various modifications of the present invention may be made without departure from the spirit and scope of the disclosure, and the invention may be embodied and/or practiced suitably in the absence and/or to the exclusion of process steps and/or manipulations, conditions, substances and/or ingredients manipulated and/ or limitations not specifically disclosed herein.

We claim:

1. A process for preparing fried noodles comprising aggregating a plurality of strips of noodle dough to form a cake mass of a plurality of noodle strips, wherein the dough comprises gelatinized starch of a farinaceous base ingredient and comprises a maltodextrin ingredient, subjecting the cake mass to a temperature in a range of from 100° C. to about 220° C. for a time sufficient to reduce the cake mass moisture content to obtain a cake dried so that the dried cake noodles have a moisture content in a range of from about 10% up to less than 30% by weight, frying the dried cake in a mass of an edible oil heated sufficiently to fry the dried cake noodles to obtain a fried cake and separating the fried cake from the frying oil mass.

2. A process according to claim 1 wherein the maltodextrin ingredient is present in an amount of up to about 5% by weight based upon the farinaceous ingredient weight.

3. A process according to claim 1 wherein the maltodextrin ingredient is in an amount of from 3% to 5% by weight based upon the farinaceous ingredient weight.

4. A process according to claim 1 wherein the cake mass is subjected to the temperature of from 100° C. to 220° C. with air having the temperature of from 100° C. to 220° C.

5. A process according to claim 1 wherein the cake mass is subjected to the temperature of from 100° C. to 220° C. by means comprising means selected from the group consisting of microwaves and infrared radiation.

6. A process according to claim 1 wherein the cake mass has a moisture content of at least about 30% and the cake mass is subjected to the temperature of from 100° C. to 220° C. for a time so that the dried cake noodles have a moisture content in the range of at least about 10% and less than 25% by weight.

7. A process according to claim 1 further comprising removing oil adhering to surfaces of the fried cake separated from the oil mass.

8. A process according to claim 1 wherein the dough strips have a protein content of from 8% to 13% by weight.

9. A process according to claim 1 wherein the dough strips further comprise a wheat gluten ingredient.

10. A process according to claim 1 wherein the cake mass is subjected to a temperature in a range of from about 110° C. to about 220° C.

11. A process according to claim 1 wherein the cake mass is subjected to the temperature of from 100° C. to 220° C. in the absence of the delivery of steam for heating.

12. A process according to claim 1 wherein the dough strips further comprise an ingredient selected from the group consisting of alkali metal carbonates and alkali metal phosphates.

13. A process according to claim 12 wherein the alkali metal carbonates are selected from the group consisting of potassium carbonates and sodium carbonates and the alkali metal phosphates are selected from the group consisting of potassium phosphates and sodium phosphates.

14. A process for preparing fried noodles comprising preparing strips of noodle dough comprising a farinaceous base ingredient and maltodextrin so that starch of the noodle dough strips is gelatinized and frying the noodle dough strips in a mass of an edible frying oil heated sufficiently to fry the dough strips to obtain fried strips and separating the fried strips from the frying oil mass.

15. A process according to claim 14 wherein the noodle dough strips are prepared with maltodextrin in an amount of from 3% to 5% by weight based upon the weight of the farinaceous base ingredient.

* * * * *